(12) United States Patent
Maxwell et al.

(10) Patent No.: US 9,806,956 B1
(45) Date of Patent: Oct. 31, 2017

(54) MANAGING COMPUTING RESOURCES BY PREDICTING RESOURCE USAGE

(71) Applicant: SAS Institute Inc., Cary, NC (US)

(72) Inventors: Matthew Scott Maxwell, Cary, NC (US); Jing (Jennie) Hu, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/495,421

(22) Filed: Apr. 24, 2017

Related U.S. Application Data

(60) Provisional application No. 62/394,890, filed on Sep. 15, 2016.

(51) Int. Cl.
| | |
|---|---|
| *G06F 15/173* | (2006.01) |
| *H04L 12/24* | (2006.01) |
| *H04L 12/26* | (2006.01) |
| *H04L 29/08* | (2006.01) |
| *H04L 12/927* | (2013.01) |

(52) U.S. Cl.
CPC ........ *H04L 41/145* (2013.01); *H04L 41/0816* (2013.01); *H04L 43/16* (2013.01); *H04L 47/803* (2013.01); *H04L 67/22* (2013.01); *H04L 67/36* (2013.01)

(58) Field of Classification Search
CPC . H04L 41/145; H04L 41/0816; H04L 47/803; H04L 67/36
See application file for complete search history.

(56) References Cited

U.S. PATENT DOCUMENTS

| | | | | |
|---|---|---|---|---|
| 6,012,052 | A | * | 1/2000 | Altschuler ........ G06F 17/30902 |
| 9,274,850 | B2 | * | 3/2016 | Gohad .................. G06F 9/5072 |
| 2008/0301673 | A1 | * | 12/2008 | Kawasaki ........... G06F 9/45516 718/1 |
| 2010/0161409 | A1 | * | 6/2010 | Ryu ....................... G06Q 30/02 705/14.43 |

(Continued)

OTHER PUBLICATIONS

"Cloud Client Prediction Models for Cloud Resource Provisioning in a Multitier Web Application Environment"—Akindele Bankole, Dept. of Systems and Computer Engineering, Ottawa-Carleton Institute for Electrical and Computer Engineering, Apr. 2013 http://www.sce.carleton.ca/faculty/schwartz/RCTI/Seminar%20Day/Autonomous%20vehicles/theses/Akindele-MAS.*

*Primary Examiner* — Randy Scott
(74) *Attorney, Agent, or Firm* — Kilpatrick Townsend & Stockton LLP

(57) ABSTRACT

Resources can be managed by predicting resource usage. For example, a first computing resource having a first attribute with a first value can be identified. A second computing resource having a second attribute with a second value can also be identified. A configuration parameter can be determined based on at least one of historical data or a predetermined probability. A predetermined model can be used to predict a first amount of interest in the first computing resource based on the first value, the second value, and the configuration parameter. The predetermined model can also be used to predict a second amount of interest for the second computing resource based on the first value, the second value, and the configuration parameter. Information related to the predicted first amount of interest in the first computing resource and the predicted second amount of interest in the second computing resource can be transmitted.

27 Claims, 14 Drawing Sheets

(56) References Cited

U.S. PATENT DOCUMENTS

2012/0198447 A1* 8/2012 Osogami .............. G06F 9/5066
718/1
2016/0092813 A1* 3/2016 Baker .............. G06Q 10/06313
705/7.23

* cited by examiner

MANAGING COMPUTING RESOURCES BY PREDICTING RESOURCE USAGE

REFERENCE TO RELATED APPLICATION

This claims the benefit of priority under 35 U.S.C. §119(e) to U.S. Provisional Patent Application No. 62/394,890, filed Sep. 15, 2016, the entirety of which is hereby incorporated by reference herein.

TECHNICAL FIELD

The present disclosure relates generally to process management on a digital processing system, such as by allocating resources of the digital processing system. More specifically, but not by way of limitation, this disclosure relates to managing computing resources by predicting resource usage.

BACKGROUND

A computing resource can include a physical or virtual component within a computer system. For example, a computing resource can be a hardware component or a software component within a computer system. Specific examples of a computing resource can include a processing thread; memory, such as random access memory, virtual memory, or cache space; a virtual machine; a software application; a database; a memory device; a processing device; a hard disk; network throughput; an input/output port, etc. Computing resources may be of limited or unlimited availability within the computer system.

SUMMARY

In one example, a non-transitory computer readable medium comprising program code executable by a processor is provided. The program code can cause the processor to identify a first computing resource having a first attribute with a first value. The program code can cause the processor to identify a second computing resource that is selectable as an alternative to the first computing resource and having a second attribute with a second value that is lower than the first value of the first attribute. The program code can cause the processor to determine a configuration parameter based on at least one of (i) historical data that indicates a number of times the second computing resource was selected instead of the first computing resource, or (ii) a predetermined probability indicating a rate in which the first computing resource was used or another rate in which the first computing resource was not used after being selected. The configuration parameter can indicate a likelihood that the second computing resource will be selected over the first computing resource. The program code can cause the processor to predict, using a predetermined model, a first amount of interest in the first computing resource based on the first value, the second value, and the configuration parameter. The program code can cause the processor to predict, using the predetermined model, a second amount of interest for the second computing resource based on the first value, the second value, and the configuration parameter. The program code can cause the processor to transmit an electronic communication indicating the predicted first amount of interest in the first computing resource and the predicted second amount of interest in the second computing resource.

In another example, a system is provided that can include a processing device and a memory device. The memory device can include instructions executable by the processing device for causing the processing device to identify a first computing resource having a first attribute with a first value. The instructions can cause the processor to identify a second computing resource that is selectable as an alternative to the first computing resource and having a second attribute with a second value that is lower than the first value of the first attribute. The instructions can cause the processor to determine a configuration parameter based on at least one of (i) historical data that indicates a number of times the second computing resource was selected instead of the first computing resource, or (ii) a predetermined probability indicating a rate in which the first computing resource was used or another rate in which the first computing resource was not used after being selected. The configuration parameter can indicate a likelihood that the second computing resource will be selected over the first computing resource. The instructions can cause the processor to predict, using a predetermined model, a first amount of interest in the first computing resource based on the first value, the second value, and the configuration parameter. The instructions can cause the processor to predict, using the predetermined model, a second amount of interest for the second computing resource based on the first value, the second value, and the configuration parameter. The instructions can cause the processor to transmit an electronic communication indicating the predicted first amount of interest in the first computing resource and the predicted second amount of interest in the second computing resource.

In another example, a method is provided that can include identifying a first computing resource having a first attribute with a first value. The method can include identifying a second computing resource that is selectable as an alternative to the first computing resource and having a second attribute with a second value that is lower than the first value of the first attribute. The method can include determining a configuration parameter based on at least one of (i) historical data that indicates a number of times the second computing resource was selected instead of the first computing resource, or (ii) a predetermined probability indicating a rate in which the first computing resource was used or another rate in which the first computing resource was not used after being selected. The configuration parameter can indicate a likelihood that the second computing resource will be selected over the first computing resource. The method can include predicting, using a predetermined model, a first amount of interest in the first computing resource based on the first value, the second value, and the configuration parameter. The method can include predicting, using the predetermined model, a second amount of interest for the second computing resource based on the first value, the second value, and the configuration parameter. The method can include transmitting an electronic communication indicating the predicted first amount of interest in the first computing resource and the predicted second amount of interest in the second computing resource. Some or all of the steps of the method can be implemented by a processor.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

Figure 1:
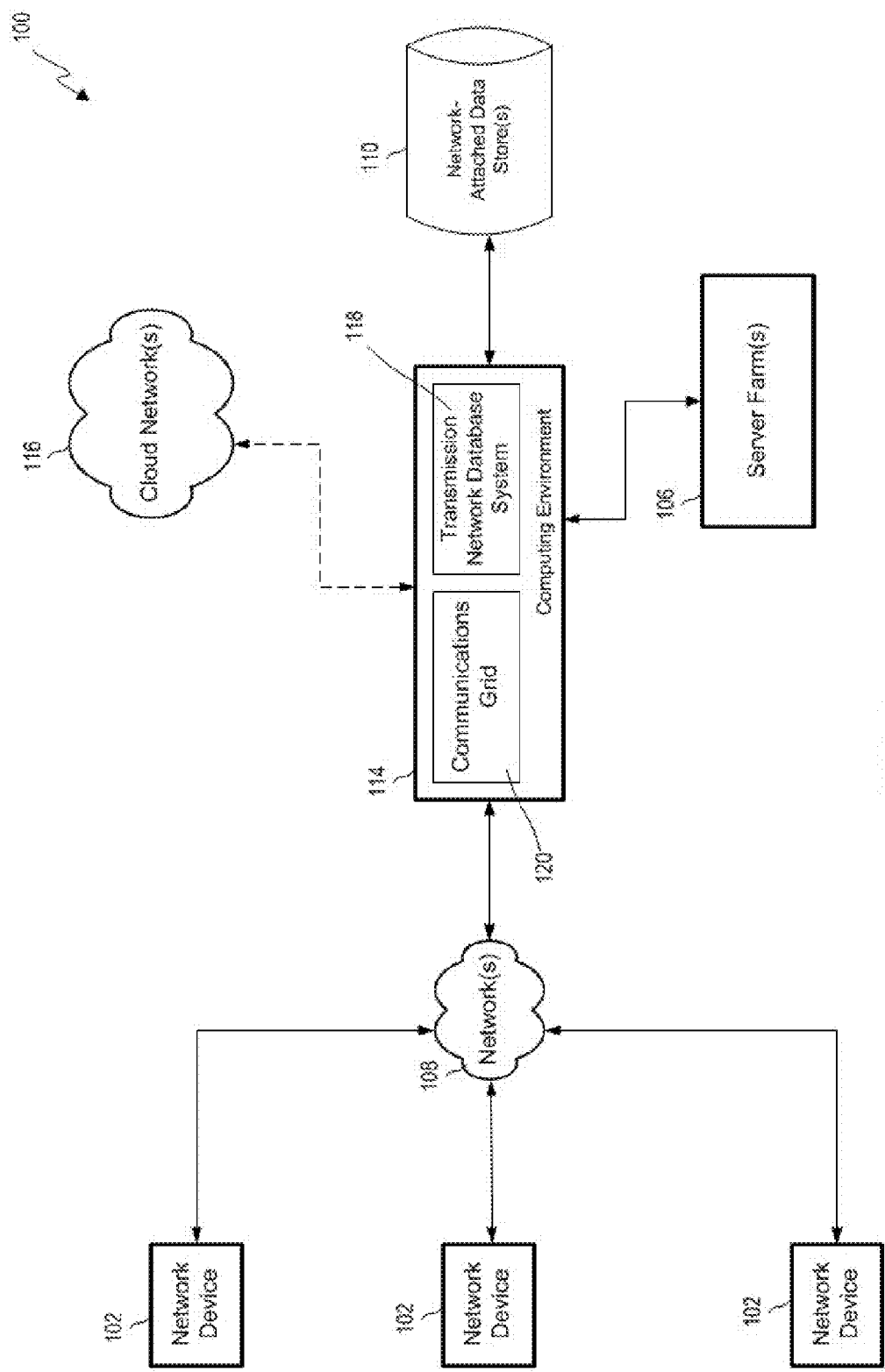
FIG. 1 is a block diagram of an example of the hardware components of a computing system according to some aspects.

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to managing resources. A resource can be any physical item or virtual item usable for performing a task. Some resources can be computing resources. Examples of computing resources can include physical items, such as computing devices, processing devices, and memory devices; virtual items such as processing threads, memory, virtual machines, software applications, and databases; or any combination of these. Other examples of resources can include spaces, such as hotel rooms, homes, or garages; products, such as cars, shoes, clothes, or retail items; or any combination of these.

Resources can be managed based on their attributes. An attribute can be any physical characteristic, virtual characteristic, or other characteristic related to a resource. Examples of an attribute of a resource can include a number of memory access associated with the resource, a number of processing cycles associated with the resource, a network throughput associated with the resource, a price associated with the resource, a height or width associated with the resource, a color or shape associated with the resource, a manufacturer associated with the resource, or any combination of these.

In some examples, computing resources can be managed by analyzing the available computing-resources to determine (i) which computing resource to use for a particular task; (ii) how likely it is for one computing resource to be used for a particular task over another computing resource; or (iii) both of these. This may enable the available computing-resources to be used more efficiently. For example, there may be multiple alternative computing-resources that can be used to perform the same job, such as a data-processing job. But the computing resources can have different attributes that make them more or less advantageous for performing the job. For example, one computing resource may require a higher number of memory accesses than another computing resource to perform the job. In some examples, a computing device can select one of the multiple alternative computing-resources for use in performing the job based on the attributes of the computing resources. For example, the computing device can select the computing resource that requires fewer memory accesses to perform the job. The computing device can then perform the job using the selected computing-resource.

But simply comparing the attributes of the computing resources to determine which computing resource has the attribute with the lowest value may not take into account other factors, such as user preferences. For example, even though one of the abovementioned computing resources requires a higher number of memory accesses to perform the job, a user may prefer that computing resource for any number of reasons. The user may prefer the computing resource because it requires less processing time or is financially cheaper than an alternative computing resource. Some examples can take into account user preferences or other factors when determining which computing resource to use. This can enable the computing device to balance efficiency with user preference to more efficiently and effectively manage available computing-resources.

For example, the computing device can determine a configuration parameter based on historical data indicating which of the multiple computing resources one or more users have selected in the past for performing the job. Alternatively, the computing device can determine the configuration parameter based on a predetermined probability that one or more users would choose a particular computing-resource (e.g., the computing resource that requires a higher number of memory accesses or the computing resource that required the lower number of memory accesses) to perform the job. The computing device can then determine which of the multiple computing resources to use to perform the job based on the configuration parameter. For example, the computing device can predict a first amount of interest that a user might have in using the computing resource that requires the higher number of memory accesses to perform the job based on (i) a first value of a first attribute of the first computing resource, (ii) a second value of a second attribute of the second computing resource, and (iii) the configuration parameter. The computing device can additionally or alternatively predict a second amount of interest that the user might have in using the computing resource that requires the lower number of memory accesses to perform the job based on the first value, the second value, and the configuration parameter. The computing device can select one of the two computing-resources based on the first amount of interest, the second amount of interest, or both. The computing device can then perform the job using the selected computing-resource.

Some examples of the present disclosure can maximize processing power and memory usage, reduce power consumption, and improve efficiency. For example, a computing device can determine that two possible data-processing operations may be performed in the future. The computing device can then predict how many times each of the data-processing operations will be performed in the future. If one or both of the data-processing operations are predicted to be performed an undesirable number of times, the characteristics of one or both of the data-processing operations can be modified and the predictions re-determined. This process can be repeated until both of the data-processing operations are predicted to be performed in desirable amounts that, for example, improve processing efficiency, reduce the number of memory accesses that are required to be performed, or reduce power consumption.

FIGS. 1-10 depict examples of systems and methods usable for managing computing resources according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processors (e.g., distributed over one or more networks or otherwise in communication with one another) that, in some examples, can collectively be referred to as a processor.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in managing computing resources, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for managing computing resources to a network-attached data store 110 for storage. The computing environment 114 may later retrieve the data from the network-attached data store 110 and use the data to manage computing resources.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for managing computing resources.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for managing computing resources. For example, the computing environment 114, a network device 102, or both can implement one or more versions of the processes discussed with respect to FIGS. 11, 12, and 14.

Figure 2:
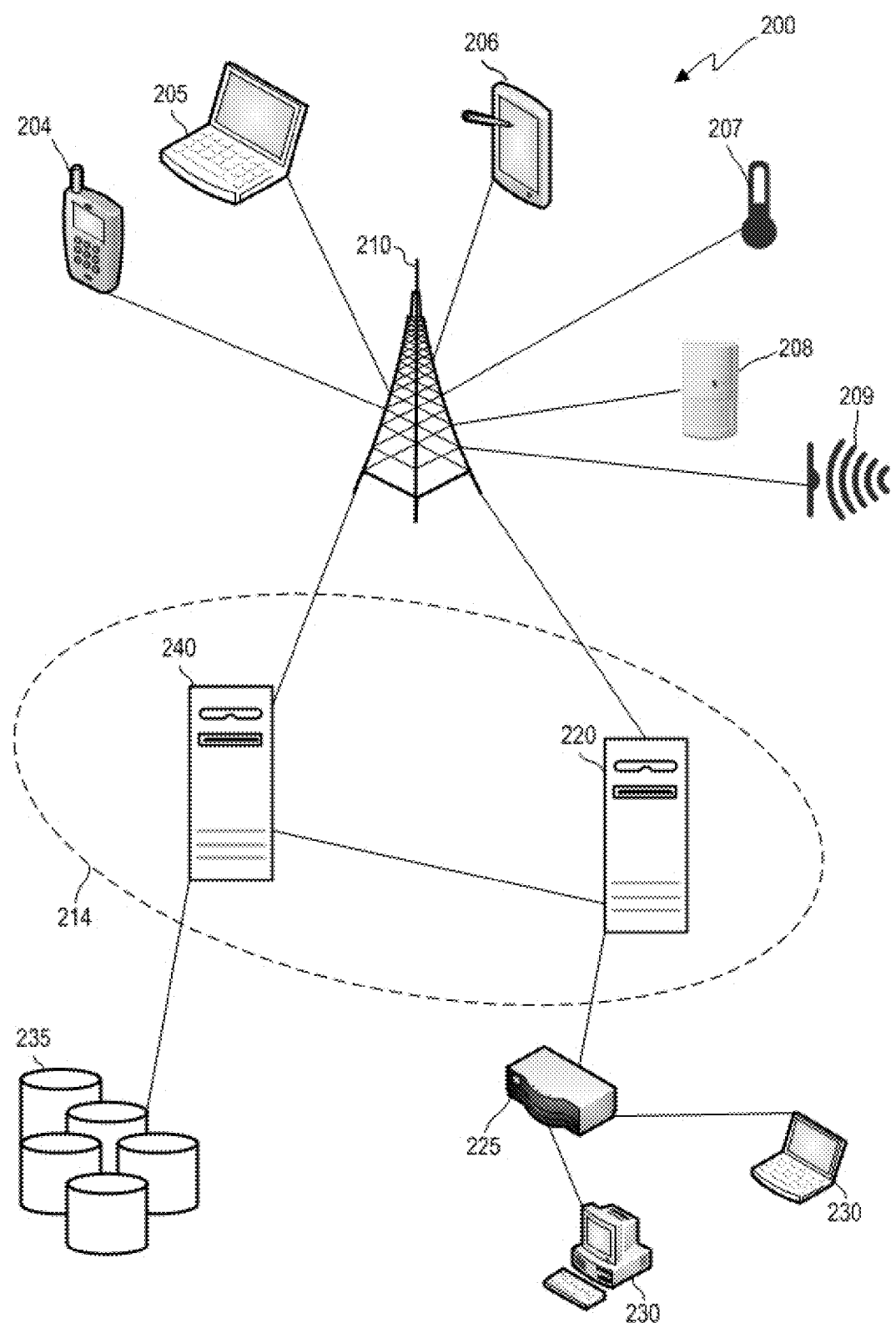
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing or use (e.g., for use in managing computing resources).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which computing resources are managed based on data, the computing environment 214 can perform a pre-analysis of the data. The pre-analysis can include determining whether the data is in a correct format for and, if not, reformatting the data into the correct format.

Figure 3:
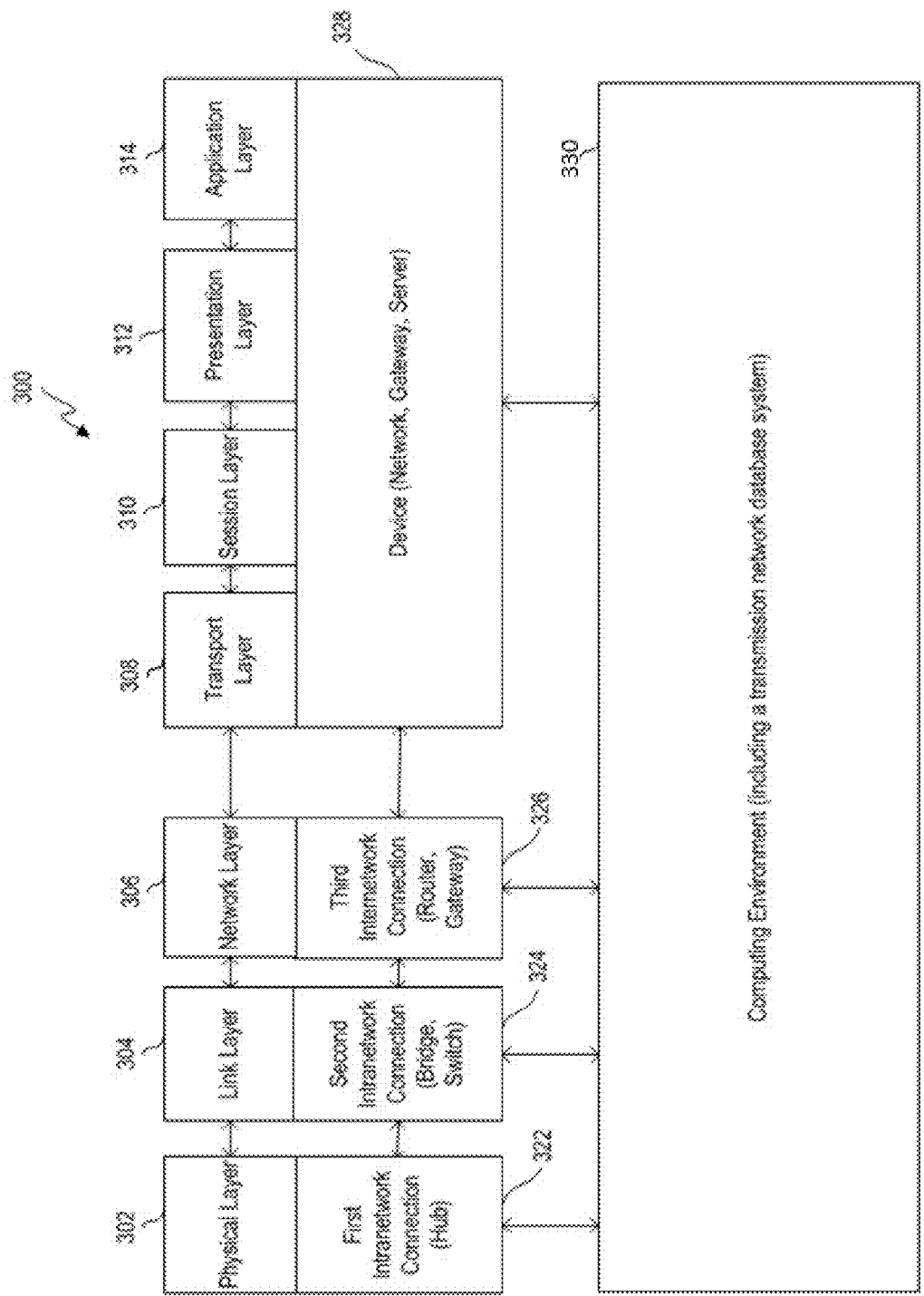
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for managing computing resources, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for managing computing resources.

Figure 4:
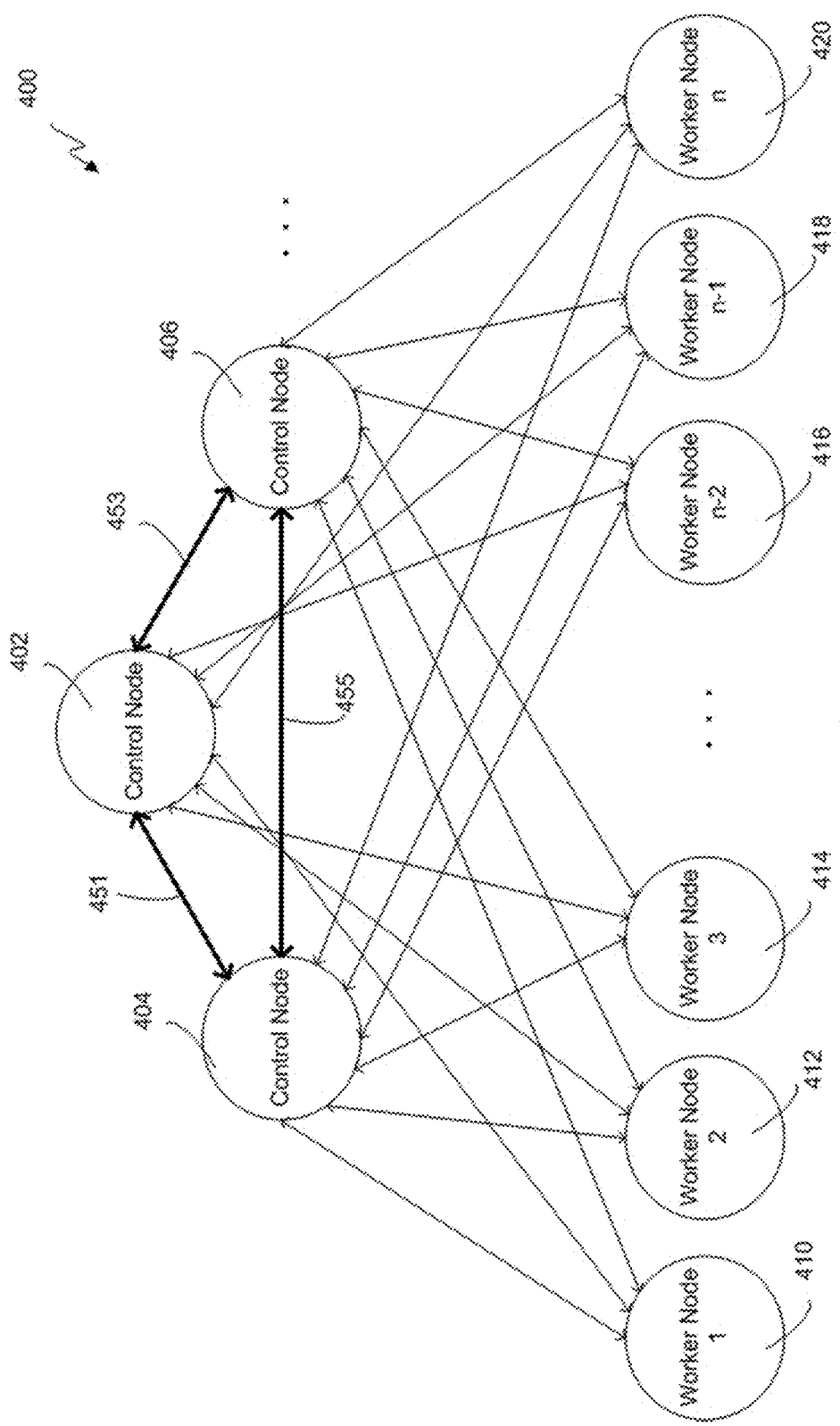
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node. In the background, as the job is being performed, the control nodes 402-406, the worker nodes 412-420, or any combination of these may individually or collectively manage available computing resources. In some examples, the control nodes 402-406 can transmit commands or otherwise control the worker nodes 412-420 to manage computing resources among the nodes.

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may use at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, computing resources in a communications grid computing system 400 can managed.

Figure 5:
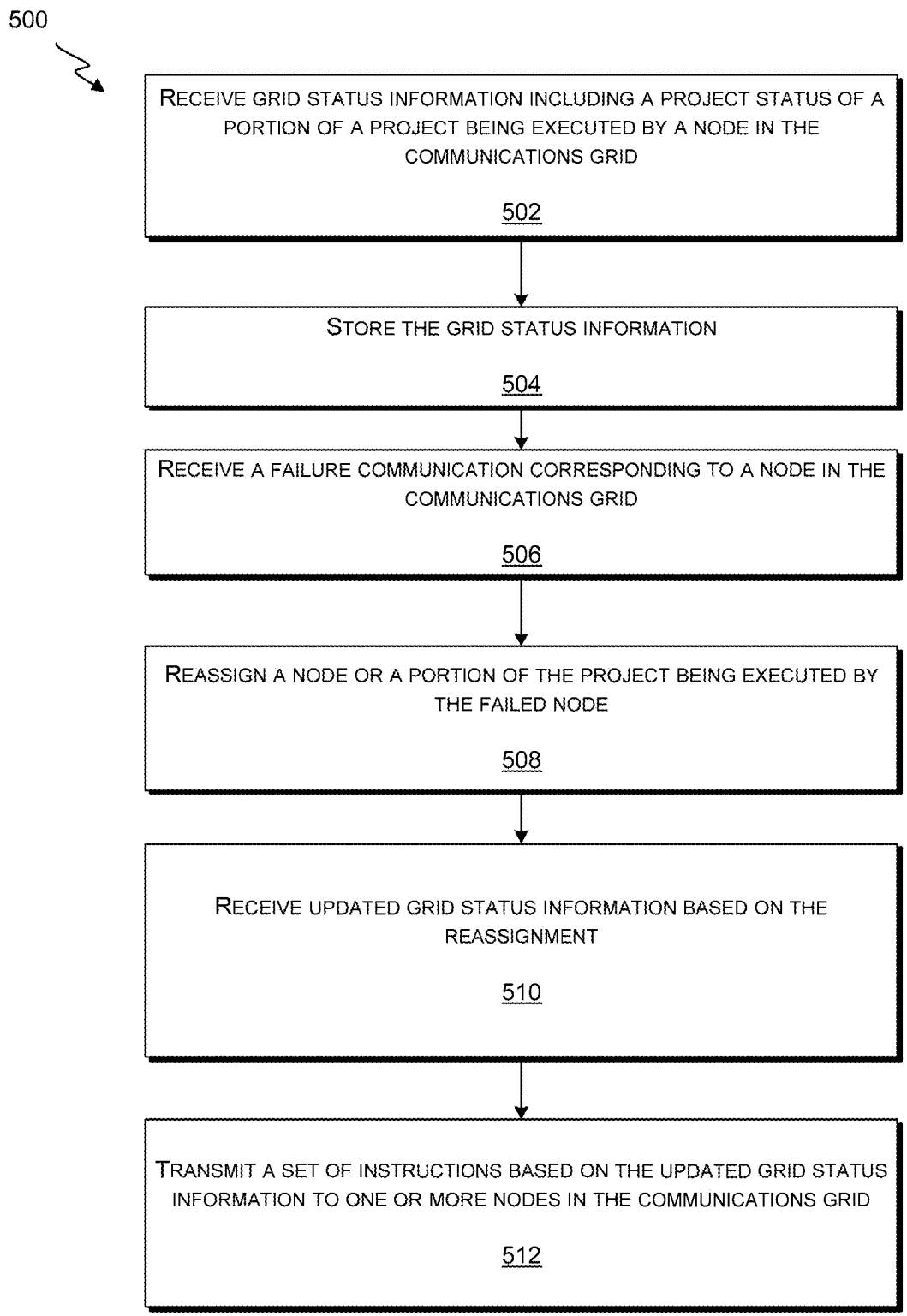
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
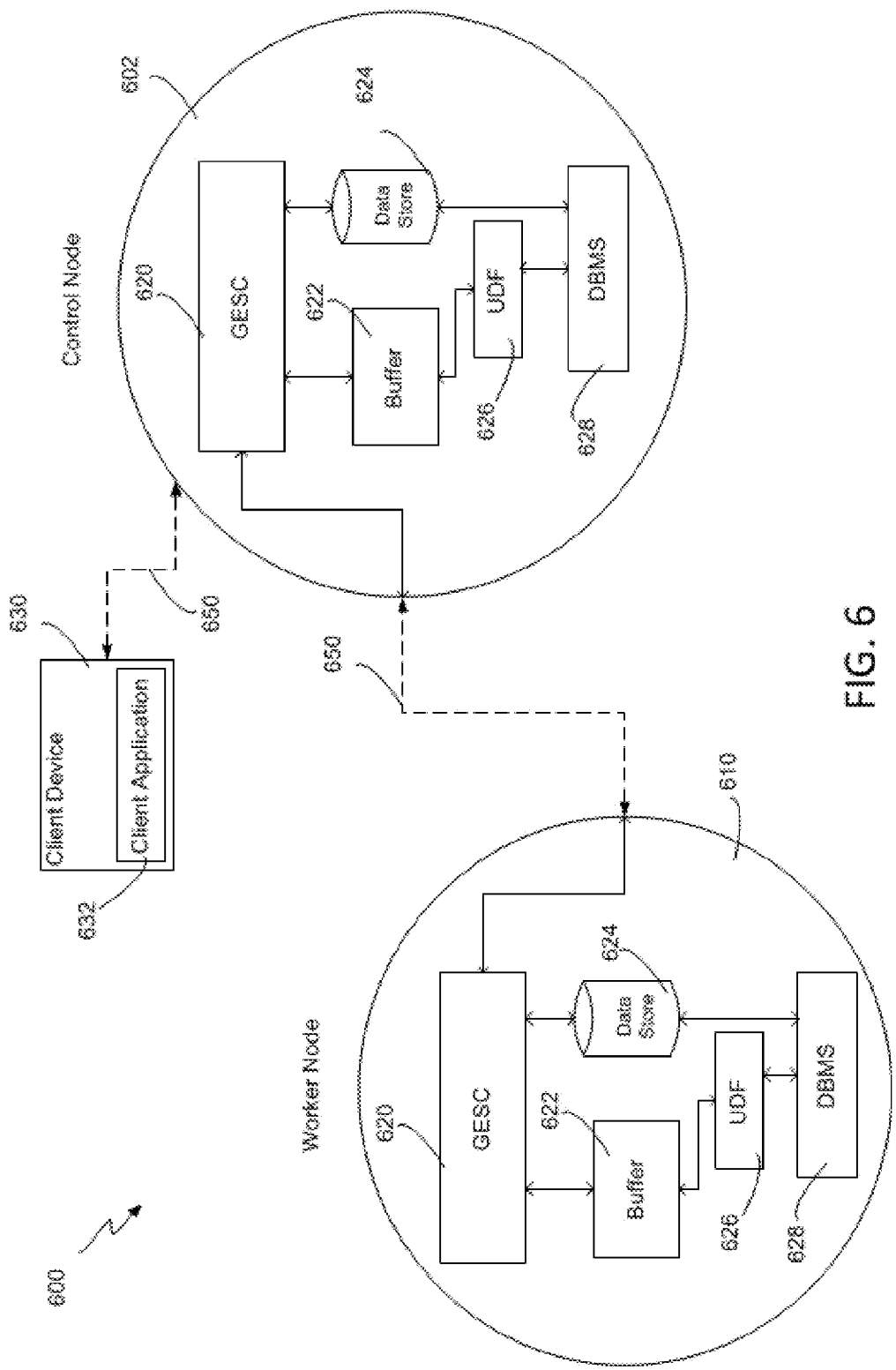
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
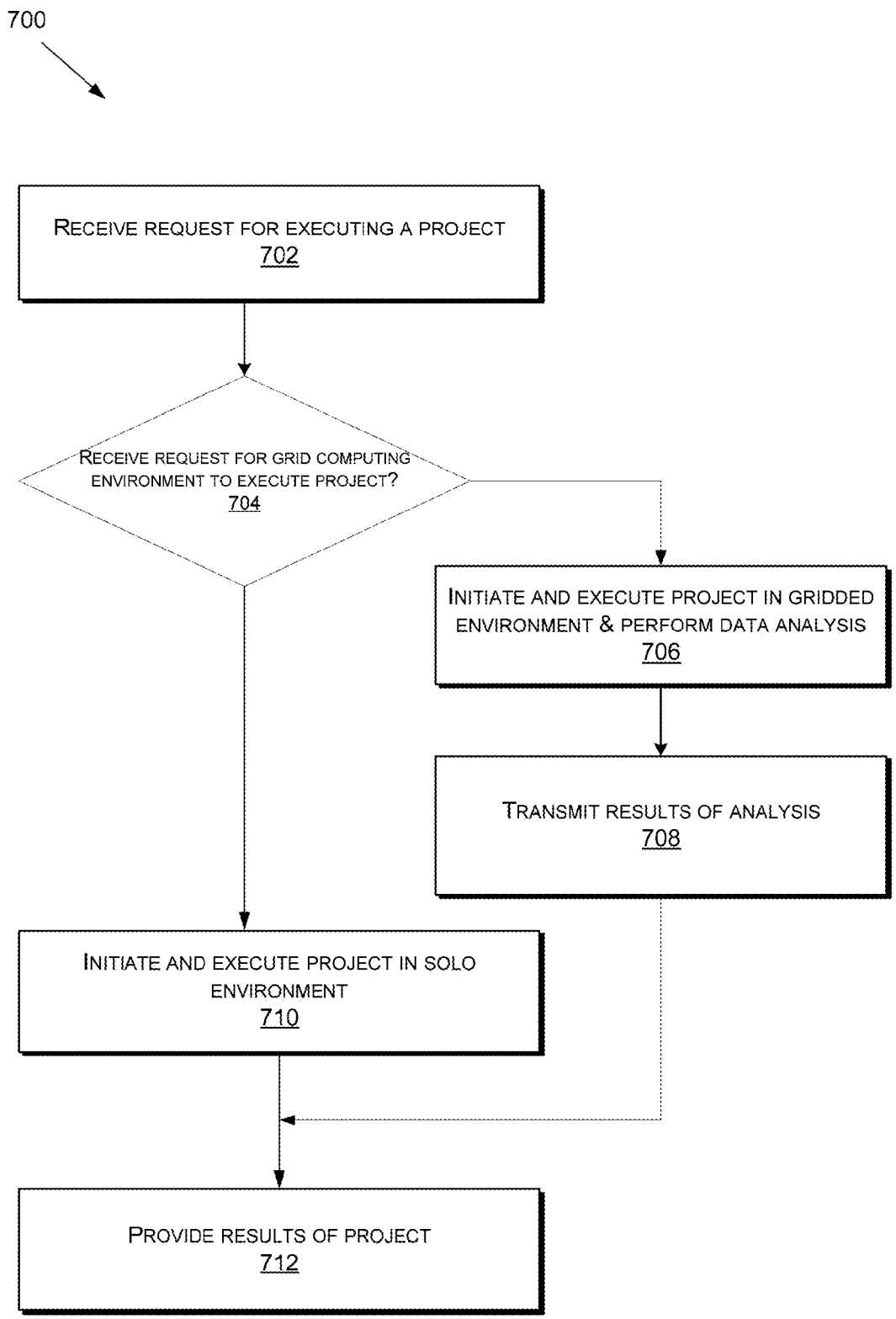
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
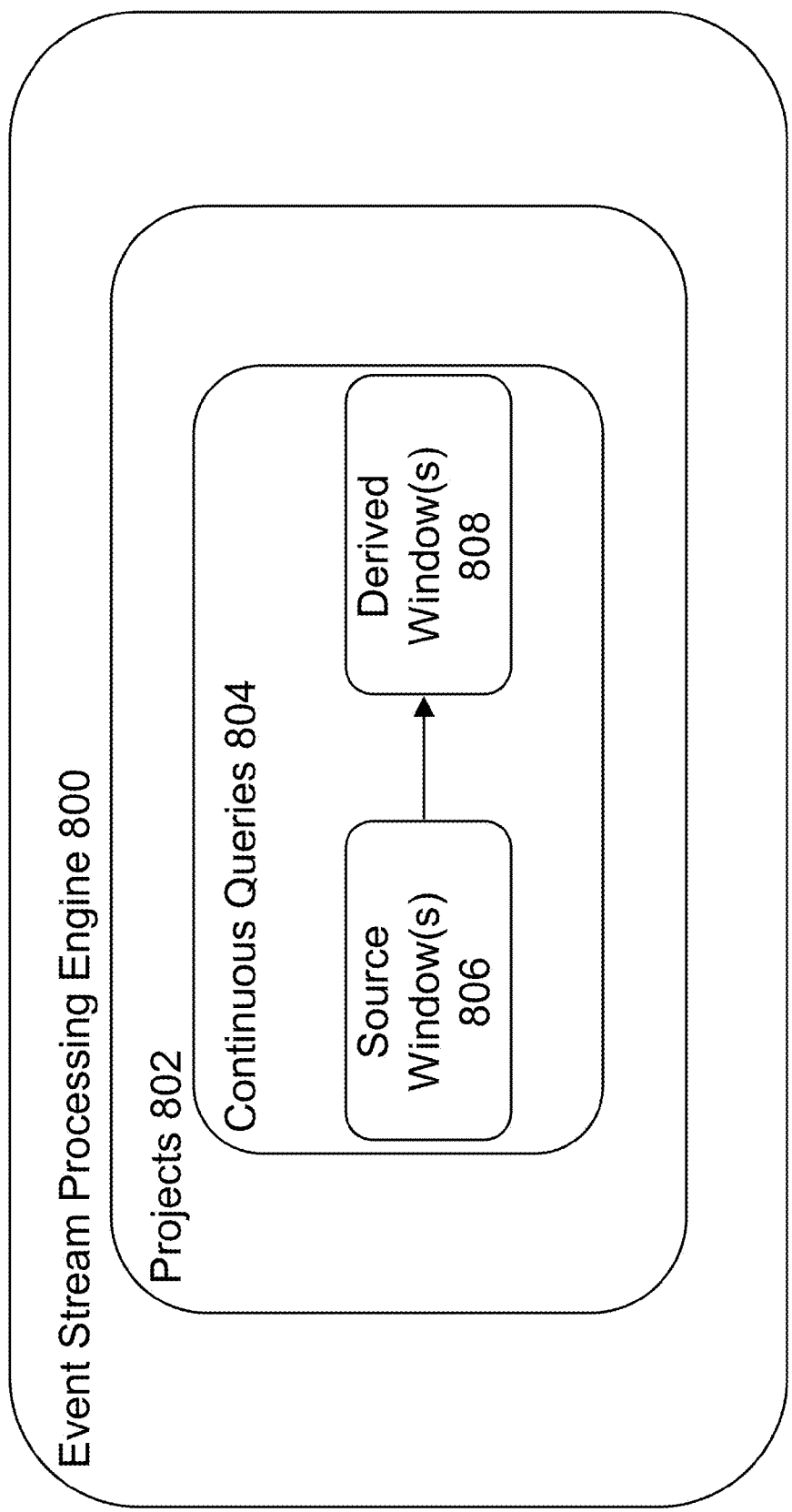
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
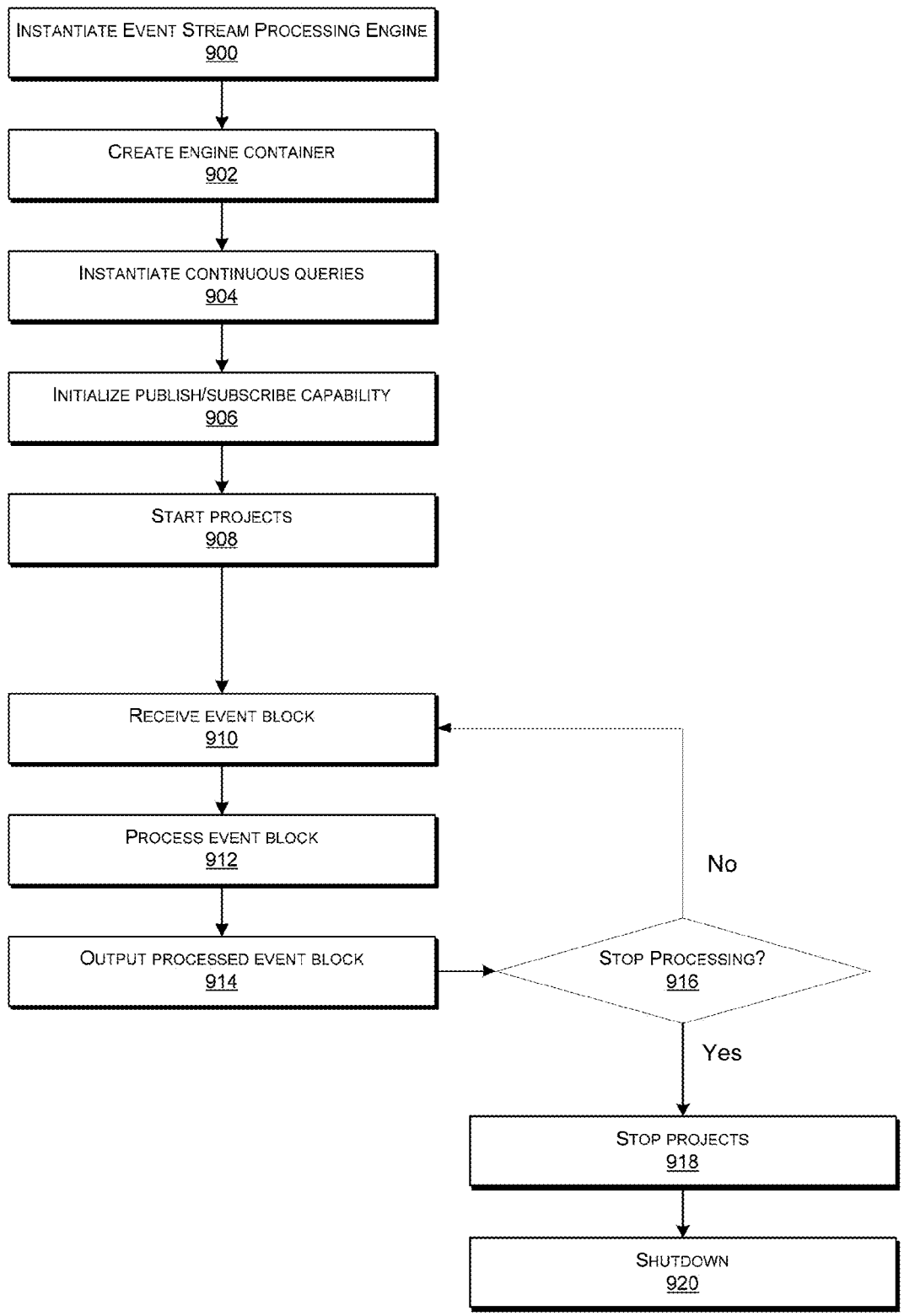
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
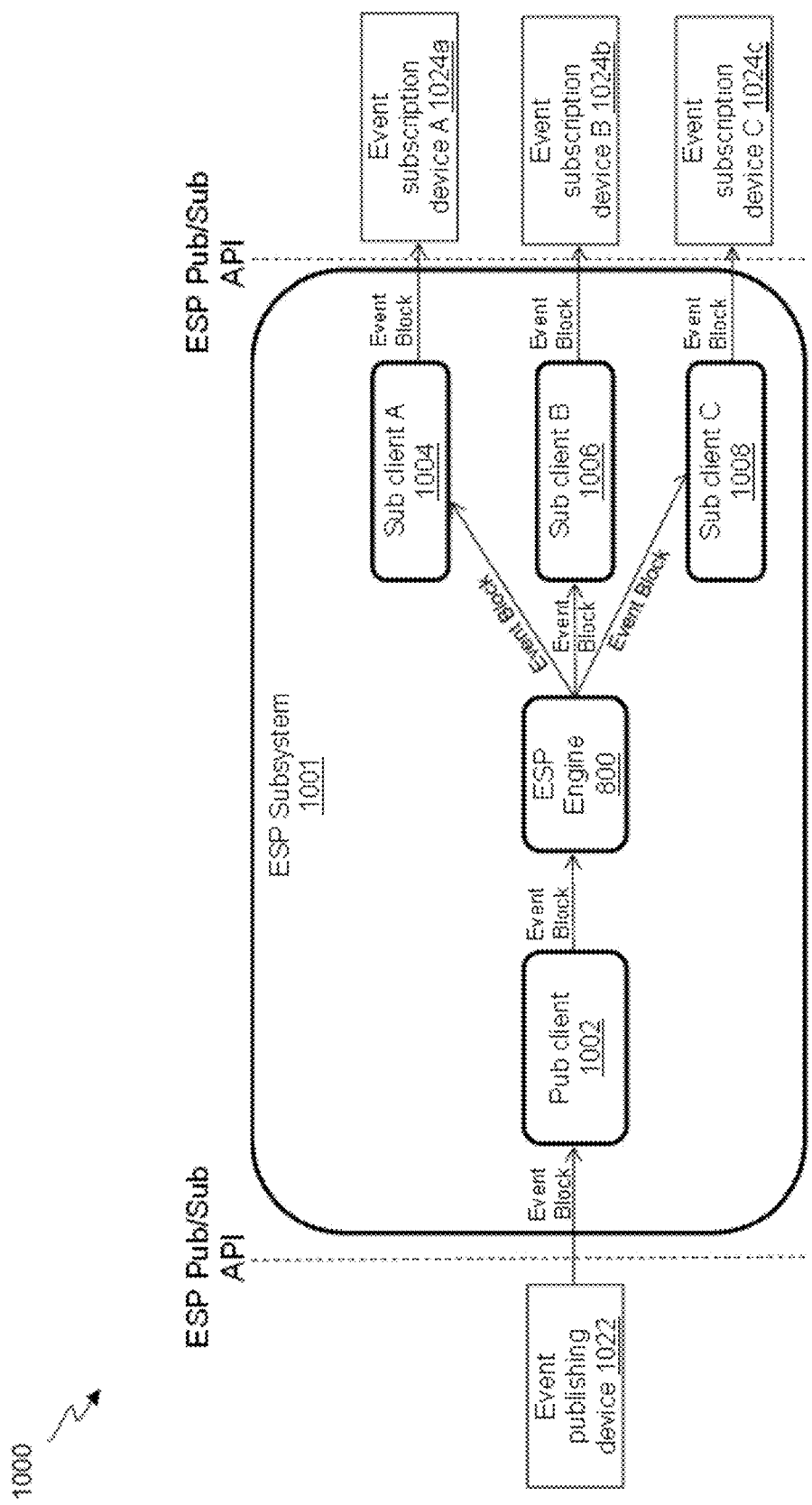
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024a-c according to some aspects. ESP system 1000 may include ESP device or subsystem 1001, publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
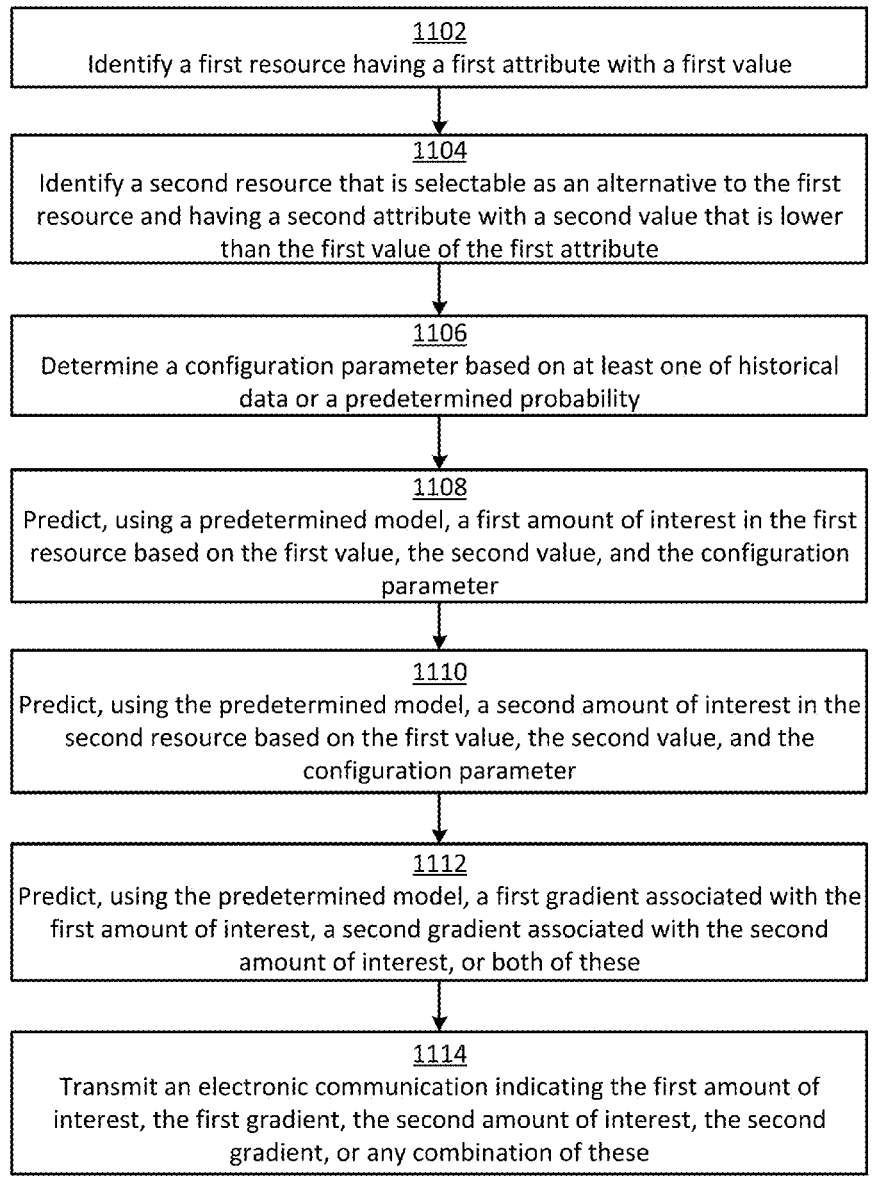
FIG. 11 is a flow chart of an example of a process for managing computing resources according to some aspects.
Figure 12:
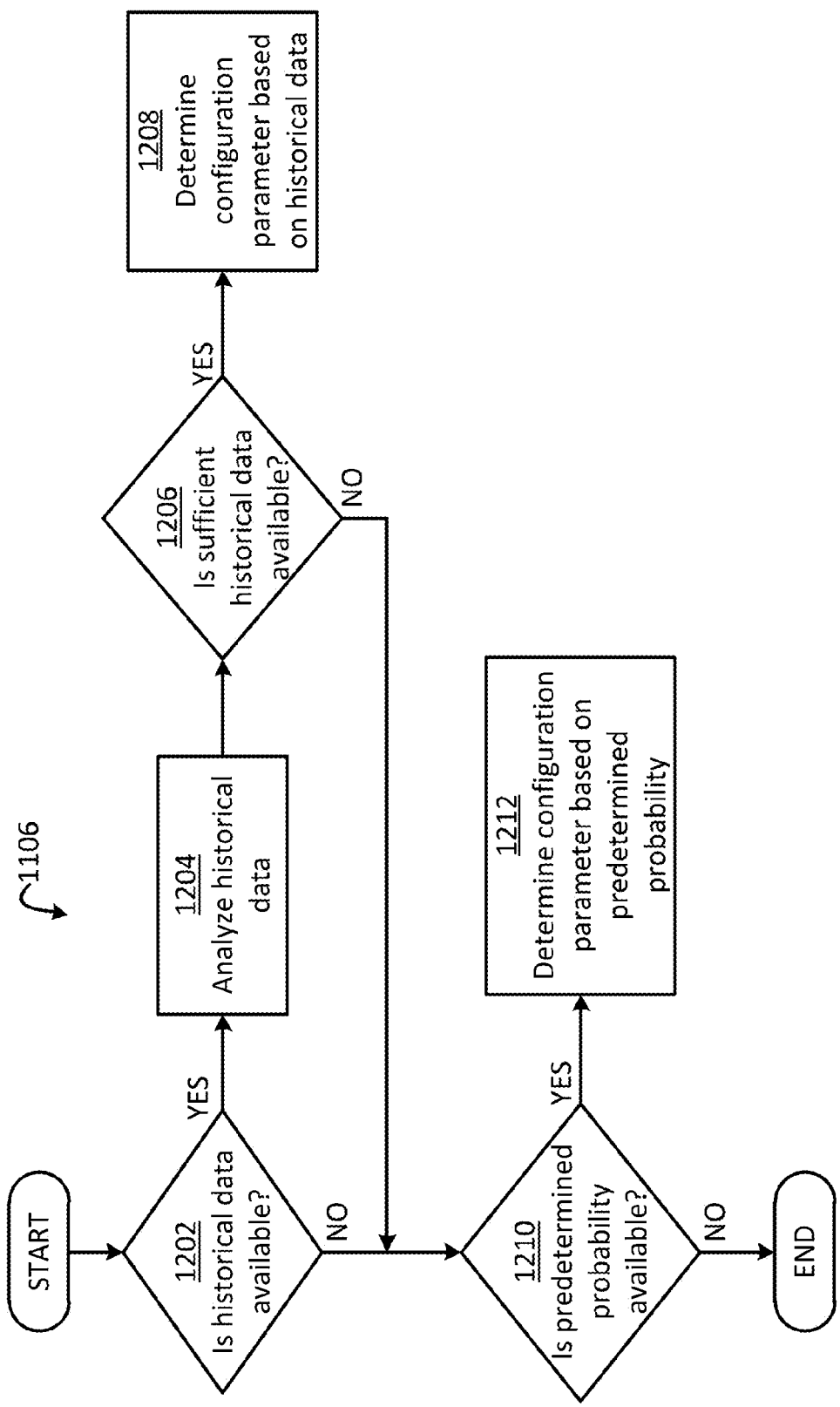
FIG. 12 is a flow chart of an example of a process for determining a configuration parameter according to some aspects.

FIG. 11 is a flow chart of an example of a process for managing computing resources according to some aspects. Some examples can include more, fewer, or different steps than the steps depicted in FIG. 11. Also, some examples can implement the steps of the process in a different order. Some examples can be implemented using any of the systems and processes described with respect to FIGS. 1-10.

In block 1102, a processing device identifies a first resource having a first attribute with a first value. In some examples, the processing device can identify the first resource by accessing a database of resources stored in memory. For example, the processing device can access the database and select the first resource from the database. The database may also include the first value of the first attribute associated with the first resource. In such an example, the processing device may also access the database to determine the first value for the first attribute of the first resource.

In other examples, the processing device can identify the first resource based on user input. For example, the processing device can receive user input indicating the first resource, the first value for the first attribute associated with the first resource, or both of these. The processing device can determine the first resource and the first value for the first attribute based on the user input.

In still other examples, the processing device can identify the first resource based on an electronic communication from a remote device. For example, the processing device can receive an electronic communication, via the Internet, indicating the first resource, first value for the first attribute, or both of these. The processing device can analyze the electronic communication to identify the first resource and determine the first value for the first attribute.

In some examples, the first resource is a computing resource. For example, the first resource can be a software application. And the first attribute can be a number of computations or processing iterations required by the software application to perform a particular function, such as storing or retrieving a particular piece of data, receiving user input or providing output (e.g., displaying a graphical user interface (GUI) on a display), performing a calculation, analyzing a piece data, controlling an electronic device, transmitting or receiving an electronic communication, etc. Another example of the first resource can be a virtual machine.

In block 1104, the processing device identifies a second resource that is selectable as an alternative to the first resource and has a second value that is lower than the first value of the first attribute. In some examples, the processing device can identify the second resource by accessing a database of resources stored in memory. For example, the processing device can access the database and select the second resource from the database. The database may also include the second value of the second attribute associated with the second resource. In such an example, the processing device may also access the database to determine the second value for the second attribute of the second resource.

In other examples, the processing device can identify the second resource based on user input. For example, the processing device can receive user input indicating the second resource, the second value for the second attribute associated with the second resource, or both of these. The processing device can determine the second resource and the second value for the second attribute based on the user input.

In still other examples, the processing device can identify the second resource based on an electronic communication from a remote device. For example, the processing device can receive an electronic communication, via the Internet, indicating the second resource, second value for the second attribute, or both of these. The processing device can analyze the electronic communication to identify the second resource and determine the second value for the second attribute.

In some examples, the second resource is a computing resource. For example, the second resource can be a software application. And the second attribute can be a number of computations or processing iterations required by the software application to perform a particular function, such as storing or retrieving a particular piece of data, receiving user input or providing output (e.g., displaying a GUI on a display), performing a calculation, analyzing a piece data, controlling an electronic device, transmitting or receiving an electronic communication, etc. As another example, the second resource can be a virtual machine.

As a particular example, the first resource can be a first virtual machine and the first attribute can be a first number of processing iterations required by the first virtual machine to perform a job. The second resource can be a second virtual machine that is selectable as an alternative to the first virtual machine. And the second attribute can be a second number of processing iterations required by the second virtual machine to perform the job. The second number of processing iterations can be less than the first number of processing iterations.

Additionally or alternatively, the first resource or the second resource can be a product. For example, the first resource can be a standard-purchase product having a standard price. The standard price can be the first value of the first attribute. And the second resource can be an advanced-purchase product having an advanced-purchase price, which may be cheaper than the standard price. The advanced-purchase price can be the second value of the second attribute. In some examples, the standard-purchase product can be for renting a hotel room at a standard price and the advanced-purchase product can be for renting the same hotel room at the advanced-purchase price.

In block 1106, the processing device determines a configuration parameter based on at least one of historical data or a predetermined probability. The configuration parameter can indicate the likelihood that the second resource will be selected over the first resource (or that the first resource will be selected over the second resource). In some examples, the processing device determines the configuration parameter at least in part by implementing the process shown in FIG. 12. Some examples can include more steps, fewer steps, different steps, or a different order of the steps than depicted in FIG. 12.

In block 1202, the processing device determines if historical data is available. The historical data can include a record of how many times the first resource was chosen over the second resource (or how many times the second resource was chosen over the first resource) during a previous time period. For example, the historical data can indicate how many times a user selected the first resource over the second resource during a two-week interval (or another predetermined, previous time-period).

The processing device can determine if the historical data is available by accessing memory (e.g., a local memory or a remote memory, such as a remote database). For example, the processing device can access a local memory to determine if a database of historical data exists, is populated, or is available for access. If so, the processing device can retrieve the historical data from the local memory. As another example, the processing device can query a remote database to determine if the historical data exists, is populated, or is available for access. If so, the processing device can retrieve the historical data from the remote database.

In block 1204, the processing device analyzes the historical data. The processing device can analyze the historical data to determine various characteristics about the historical data. For example, the processing device can analyze the historical data to determine a time period over which the historical data spans or a number of data points in the historical data. As particular examples, the processing device can analyze the historical data to determine that the historical data spans a two-week time period or has 1000 data points. The processing device can use any number and combination of techniques to analyze the historical data for various characteristics.

In block 1206, the processing device determines if sufficient historical data is available. The processing device can determine if sufficient historical data is available by comparing any number and combination of characteristics of the historical data to any number and combination of predetermined thresholds. For example, the processing device can receive user input indicating that a minimum-required timespan for the historical data is two weeks or a minimum-required amount of data for the historical data is 100 data points. The processing device can then analyze the historical data to determine if the historical data spans at least two weeks, has at least 100 data points, or both of these. If so, the processing device can determine that a sufficient amount of historical data is available. If not, the processing device can determine that an insufficient amount of historical data is available.

If the processing device determines that a sufficient amount of historical data is available, the process can proceed to block 1208. Otherwise, the process can proceed to block 1210.

In block 1208, the processing device determines the configuration parameter based on the historical data. For example, the processing device can analyze the historical data to determine the number of times that the second resource was selected instead of the first resource during a predetermined time interval. The number of times that the second resource was selected can be used to determine the configuration parameter. As another example, the processing device can analyze the historical data to determine the number of times that the first resource was selected instead of the second resource during the predetermined time interval. The number of times that the first resource was selected can be used to determine the configuration parameter.

In some examples, the processing device can estimate the configuration parameter by considering a period of time, i, in the historical data in which the first value of the first attribute for the first resource is $p_i$ and the second value of the second attribute for the second resource is $p_i'$. If $\hat{B}_i$ is the number of times in which the first resource is selected over the second resource during this period of time and $\hat{A}_i$ is the number of times in which the second resource is selected over the first resource during this period of time, the following equation can be used to estimate the configuration parameter, $u_i$:

$$\hat{B}_i\left(e^{\beta \frac{d_i p_i}{r}} e^{u_i \frac{d_i}{1-d_i}} - 1\right)u_i - \hat{A}_i\left(u_i + \frac{(1-d_i)p_i \beta}{r}\right) = 0$$

In the above equation, $d_i = 1 - p_i'/p_i$. And $\beta$ can be an elasticity parameter representing how sensitive a base-interest parameter is to a change in p. The base-interest parameter, which can be referred to as D(p), can be a baseline amount of interest in the first resource when the first resource has attribute value p and when there is no second resource available. The parameter r is a reference value for the base-interest parameter, and may be an average value expected for p. If the reference value deviates from p, the base-interest parameter may increase or decrease to account for these changes.

The processing device can determine the elasticity parameter and the reference value based on user input, an electronic communication, data in a local memory, data from a remote database, or any combination of these. In the above equation, the function of $u_i$ can have two roots, with one of the roots being positive. The positive root can be used as the value for the configuration parameter, $u_i$. The processing device can determine the positive root using, for example, Newton's method.

In some examples, the processing device can perform the above calculations over n different periods of time in the historical data to obtain multiple estimates $\{u_i\}_{i=1}^n$. The multiple estimates can be aggregated or otherwise combined to determine a single, overall estimate, which can be designated as $\hat{u}$. For example, $\hat{u}$ can be determined according to the following equation:

$$\hat{u} = \frac{1}{n}\sum_{i=1}^{n} u_i$$

In block 1210, the processing device determines if a predetermined probability is available. The predetermined probability can indicate a rate in which the first resource was used after being selected or the second resource was used after being selected. Alternatively, the predetermined probability can indicate a rate in which the first resource was not used after being selected or the second resource was not used after being selected. In some examples, the predetermined probability is a cancelation rate. For example, the predetermined probability can be a cancelation rate indicating a percentage of times in which the first resource was selected but ultimately not used (e.g., to perform jobs). As another example, the predetermined probability can be a cancelation rate indicating a percentage of times in which the second resource was selected but ultimately not used.

The processing device can determine if the predetermined probability is available by accessing memory. For example, the processing device can access a local database stored in local memory to determine if the predetermined probability exists within the local database. If the predetermined probability exists within the local database, the processing device can retrieve the predetermined probability from the local database. As another example, the processing device can query a remote database to determine if the predetermined probability exists. If so, the processing device can retrieve the predetermined probability from the remote database.

If the processing device determines that the predetermined probability is available, the process can continue to block 1212. Otherwise, the process may end and the processing device may be unable to determine the configuration parameter.

In block 1212, the processing device determines the configuration parameter based on the predetermined probability. For example, the processing device can use the following equation to determine the configuration parameter:

$$c=1+ue^u Ei(-u)$$

where c is the predetermined probability; u is the configuration parameter; and $$Ei(-u) = -\int_u^\infty \frac{e^{-t}}{t} dt,$$

which can be referred to as an exponential integral function. In some examples, the processing device can use a numerical search to find a unique value for u that corresponds to the predetermined probability, c. The processing device can use that unique value as the configuration parameter. For example, the processing device can insert the known value for c into the above equation and input random numbers for u until the above equation is satisfied. But performing the numerical search may be slow and require a higher amount of processing iterations. So, in alternative examples, the processing device may refer to a database or lookup table having precomputed (c, u) pairs to determine the configuration parameter based on the predetermined probability. This may be faster and require fewer processing iterations. One example of such a lookup table is provided below:

| c | 0.05 | 0.1 | 0.15 | 0.2 | 0.25 | 0.3 | 0.35 | 0.4 | 0.45 | 0.5 | 0.6 | 0.7 | 0.8 |
|---|------|------|------|------|------|------|------|------|------|------|------|------|------|
| u | 18.09 | 8.17 | 4.91 | 3.3 | 2.36 | 1.75 | 1.33 | 1.02 | 0.79 | 0.61 | 0.36 | 0.20 | 0.10 |

For example, if the value for c is 0.5, the processing device can access the above lookup table to determine the corresponding value for u is 0.61. If a particular predetermined probability is not in the lookup table, the processing device can determine the nearest (c, u) pairs in the lookup table and use the nearest (c, u) pairs to determine a corresponding u for the particular predetermined probability. For example, c may be 0.55, which is not in the above lookup table. But this c value falls between 0.5 and 0.6, both of which are in the lookup table and have corresponding u values of 0.61 and 0.36, respectively. So, the processing device can determine that u is between 0.61 and 0.36. The processing device can then use interpolation or another technique to determine an estimate of u that falls between 0.61 and 0.36. For example, because the value of c is 0.55, which is halfway between 0.5 and 0.6, the processing device can determine that u is halfway between 0.61 and 0.36 (i.e., 0.485).

Figure 13:
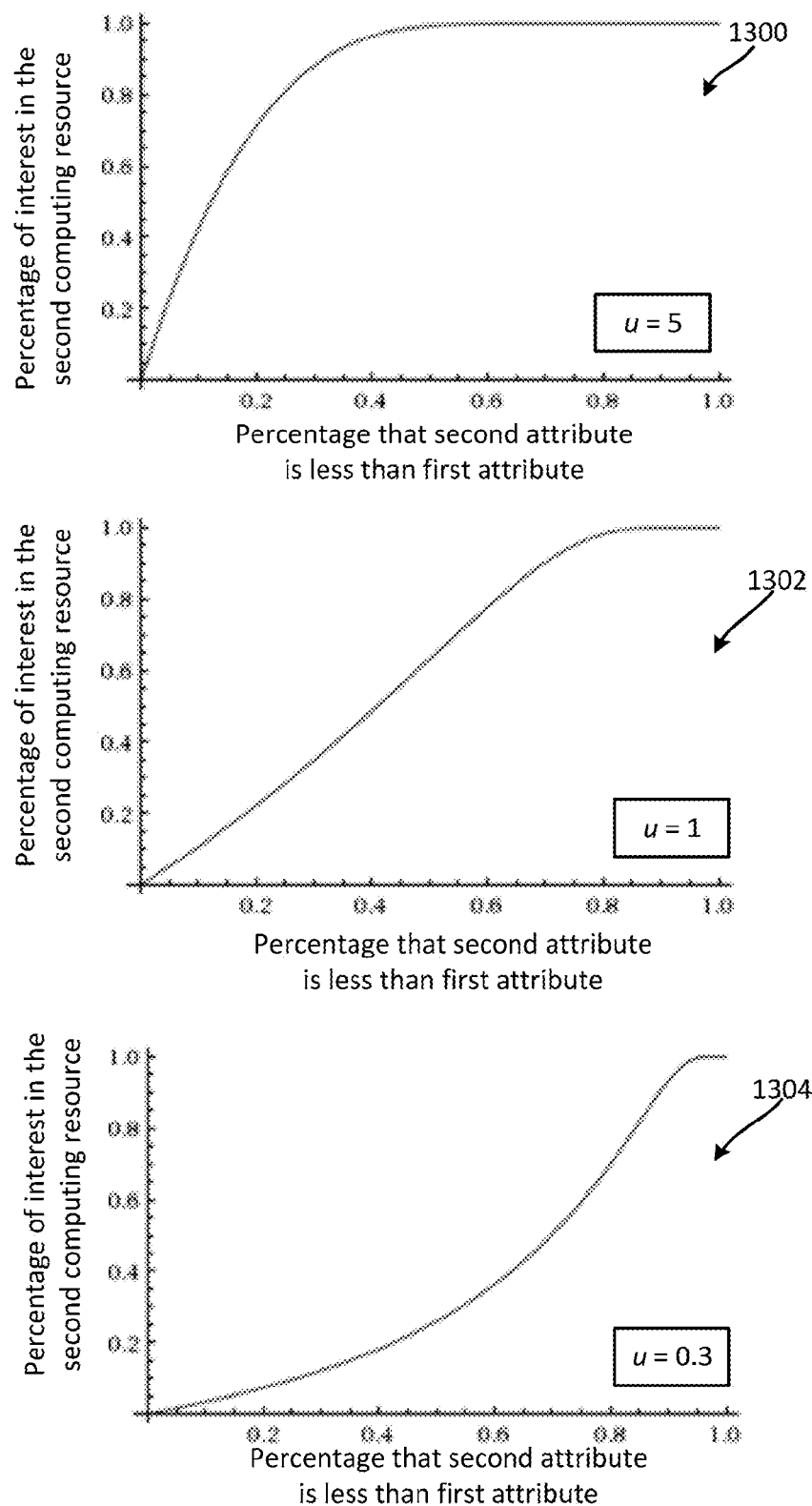
FIG. 13 is a set of graphs showing examples of interest in a second computing resource based on a percentage that a second attribute is less than a first attribute according to some aspects.

Returning to FIG. 11, in block 1108, the processing device can use a predetermined model to predict a first amount of interest in the first resource based on the first value, the second value, and the configuration parameter. For example, the predetermined model can be represented by the equation:

$$f(d) = 1 - e^{u\left(1-\frac{1}{1-d}\right)}$$

where u is the configuration parameter and $d=1-p'/p$, where p is the first value of the first attribute and p' is the second value of the second attribute. Examples of graphs generated using the predetermined model are shown in FIG. 13. In all three graphs, the X-axis indicates a percentage that the second value of the second attribute is less than the first value of the first attribute. Graph 1300 shows the percentage of interest in the second resource when u=5. Graph 1300 can indicate a high degree of interest in the second resource as the second value decreases relative to the first resource. Graph 1302 shows the percentage of interest in the second resource when u=1. Graph 1302 can indicate a moderate degree of interest in the second resource as the second value decreases relative to the first value. Graph 1304 shows the percentage of interest in the second resource when u=0.3. Graph 1304 can indicate a low degree of interest in the second resource as the second value decreases relative to the first value. As the value of the configuration parameter (u) decreases, the interest in the second resource can decrease as the second value decreases relative the first value. In some examples, the processing device can insert the first value, the second value, and the configuration parameter into the above equation to determine f(d). The processing device can then use the value of f(d) with the equation below to determine first amount of interest in the first resource:

$$D(p,d)=D(p)(1-f(d))$$

where D(p, d) is the first amount of interest in the first resource; and p is the first value associated with the first resource.

In block 1110, the processing device can use the predetermined model to predict a second amount of interest in the second resource based on the first value, the second value, and the configuration parameter. The second amount of interest can be dependent on the first amount of interest, or vice-versa. For example, the processing device can use D(p, d) determined in block 1108 with the below equation to determine the second amount of interest in the second resource:

$$D_A(p,d)=\gamma(p,d)(D((1-d)p)-D(p,d))$$

where $D_A$(p, d) is the second amount of interest in the second resource; D(p, d) is the first amount of interest in the first resource; and p is the first value associated with the first resource; and $$\gamma(p, d) = \frac{u*r}{(1-d)p*\beta + u*r}$$

where β is the elasticity parameter and r is the reference value.

In block 1112, the processing device determines a first gradient associated with the first amount of interest, a second gradient associated with the second amount of interest, or both of these. For example, the processing device can use the following algorithm(s) to determine the first gradient(s):

$$\frac{\partial}{\partial p}D(p, d) = -\frac{\beta}{r}D(p, d)$$

$$\frac{\partial}{\partial d}D(p, d) = -\frac{u}{(1-d)^2}D(p, d)$$

The processing device can also use the following algorithm(s) to determine the second gradient(s):

$$\frac{\partial}{\partial p}D_A(p, d) =$$

$$-\frac{(1-d)\beta}{(1-d)p\beta + ur}D_A(p, d) - \frac{\beta}{r}\gamma(p, d)((1-d)D((1-d)p) - D(p, d))$$

$$\frac{\partial}{\partial p}D_A(p, d) = -\frac{p\beta}{(1-d)p\beta + ur}D_A(p, d) +$$

$$\gamma(p, d)\left(\frac{p\beta}{r}D((1-d)p)\right) + \left(\frac{u}{(1-d)^2}D(p, d)\right)$$

In some examples, the first amount of interest, the first gradient(s), the second amount of interest, and the second gradient(s) can be used by the processing device to identify optimal values for the first value for the first resource and the second value for the second resource.

In block 1114, the processing device transmits an electronic communication indicating the first amount of interest, the first gradient, the second amount of interest, the second gradient, or any combination of these. In some examples, the processing device can transmit the electronic communication to a remote computing device. For example, the processing device can transmit an electronic communication over the Internet to a remote computing device, with the electronic communication indicating the first amount of interest, the first gradient, the second amount of interest, and the second gradient. In some examples, the remote computing device can perform one or more operations based on the electronic communication. For example, the remote computing device can perform one or more calculations using the first gradient, the second gradient, or both of these.

In some examples, the processing device can control a remote electronic device based on the first amount of interest, the first gradient, the second amount of interest, the second gradient, or any combination of these. For example, the processing device can transmit electronic commands or electronic control transmissions to the remote electronic device based on the first amount of interest or the second amount of interest. This may enable computing resources of the remote electronic device to be efficiently managed.

In some examples, the electronic communication can be a display transmission for causing a display device to display information, such as the first amount of interest in the first resource and the second amount of interest in the second resource. For example, the electronic communication can be a display transmission for causing the display device to output a GUI that includes the first amount of interest in the first resource or the second amount of interest in the second resource.

Figure 14:
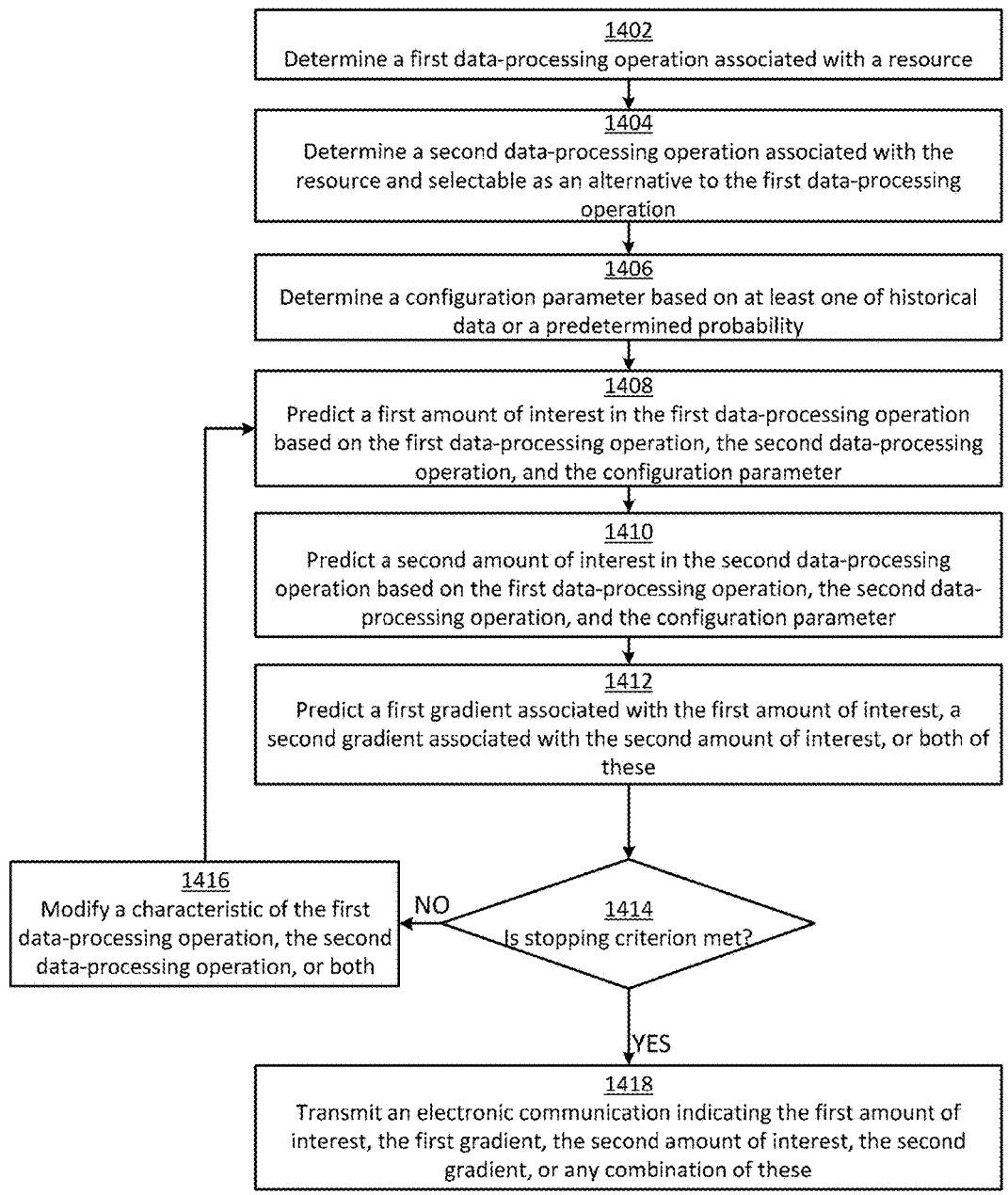
FIG. 14 is a flow chart of another example of a process for managing computing resources according to some aspects.

FIG. 14 is a flow chart of another example of a process for managing computing resources according to some aspects. Some examples can include more, fewer, or different steps than the steps depicted in FIG. 14. Also, some examples can implement the steps of the process in a different order. Some examples can be implemented using any of the systems and processes described with respect to FIGS. 1-10.

In block 1402, a processing device determines a first data-processing operation associated with a resource. The resource can be a physical object or a computing resource. The first data-processing operation can be one or more processes for storing information related to the resource in memory. In some examples, the processing device can determine the first data-processing operation by analyzing available data-processing operations and determine which of the available data-processing operations are associated with the resource.

In block 1404, the processing device determines a second data-processing operation associated with the resource. The second data-processing operation can be selectable as an alternative to the first data-processing operation. The second data-processing operation can be one or more processes for storing information related to the resource in memory. In some examples, the processing device can determine the second data-processing operation by analyzing available data-processing operations and determine which of the available data-processing operations are associated with the resource.

In block 1406, the processing device determines a configuration parameter based on at least one of historical data or a predetermined probability. The historical data can indicate which of the data-processing operations one or more users have selected in the past. The predetermined probability can indicate the likelihood that one or more users would choose the first data-processing operation over the second-data storage operation (or vice-versa). In some examples, the processing device can determine the configuration parameter using any number and combination of the processes discussed above with respect to block 1106 of FIG. 11.

In block 1408, the processing device predicts a first amount of interest (e.g., how many times the first data-processing operation might be performed) in the first data-processing operation based on the first data-processing operation, the second data-processing operation, and the configuration parameter. For example, the processing device can predict the first amount of interest based on a first value to be stored in memory using the first data-processing operation, a second value to be stored in memory using the second data-processing operation, or both of these. The processing device may predict the first amount of interest at least in part by using a predetermined model. In some examples, the processing device can determine the first amount of interest using any number and combination of the processes discussed above with respect to block 1108 of FIG. 11.

In block 1410, the processing device predicts a second amount of interest (e.g., how many times the second data-processing operation might be performed) in the second data-processing operation based on the first data-processing operation, the second data-processing operation, and the configuration parameter. For example, the processing device can predict the second amount of interest based on a first value to be stored in memory using the first data-processing operation, a second value to be stored in memory using the second data-processing operation, or both of these. The processing device may predict the second amount of interest at least in part by using a predetermined model. In some examples, the processing device can determine the second amount of interest using any number and combination of the processes discussed above with respect to block 1110 of FIG. 11.

In block 1412, the processing device predicts a first gradient associated with the first amount of interest, a second gradient associated with the second amount of interest, or both of these. The processing device may predict the first gradient, the second gradient, or both of these at least in part by using a predetermined model. In some examples, the processing device can predict the first gradient, the second gradient, or both using any number and combination of the processes discussed above with respect to block 1112 of FIG. 11.

In block 1414, the processing device determines if a stopping criterion is met. The stopping criterion can include the first amount of interest being above, below, or equal to a first amount; the second amount of interest being above, below, or equal to a second amount; or both. The first amount and the second amount can be provided as user input. In some examples, the stopping criterion can include a gradient of a function being zero based on the predicted first amount of interest in the first data-processing operation and the predicted second amount of interest in the second data-processing operation. If the processing device determines that the stopping criterion is met, the process can continue to block 1418. Otherwise, the process can continue to block 1416.

In block 1416, the processing device modifies a characteristic of the first data-processing operation, the second data-processing operation, or both. For example, the processing device can reduce a first value associated with the first data-processing operation and increase a second value associated with the second data-processing operation (or vice-versa). In some examples, the processing device can receive user input indicating a new value for the first value, a new value for the second value, or both. The processing device can modify the characteristics of the first data-processing operation, the second data-processing operation, or both based on the new value(s).

After modifying the characteristic(s) of the first data-processing operation, the second data-processing operation, or both, the process can return to block 1406, where the processing device can re-determine the configuration parameter based on the modified data-processing operation(s). The process can then repeat some or all of the remaining steps. For example, the process may repeat steps 1406-1416 until the first amount of interest, the second amount of interest, or both reach the desired amount, at which point the process can continue to block 1418.

In block 1418, the processing device transmits an electronic communication indicating the first amount of interest, the first gradient, the second amount of interest, the second gradient, or any combination of these. In some examples, the processing device can transmit the electronic communication or implement any of the other features as discussed above with respect to block 1114 of FIG. 11.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer readable medium comprising program code executable by a processor for causing the processor to:
   identify a first resource having a first attribute with a first value;
   identify a second resource that is selectable as an alternative to the first resource and having a second attribute with a second value that is lower than the first value of the first attribute;
   determine a configuration parameter based on at least one of (i) historical data that indicates a number of times the second resource was selected instead of the first resource, or (ii) a predetermined probability indicating a rate in which the first resource was used or another rate in which the first resource was not used after being selected, the configuration parameter indicating a likelihood that the second resource will be selected over the first resource;
   predict, using a predetermined model, a first amount of interest in the first resource based on the first value, the second value, and the configuration parameter;
   predict, using the predetermined model, a second amount of interest for the second resource based on the first value, the second value, the configuration parameter, an elasticity parameter representing how sensitive a base-interest parameter is to a change in another parameter on which the base-interest parameter depends, and a reference value for the first attribute and the second attribute; and transmit an electronic communication indicating the predicted first amount of interest in the first resource and the predicted second amount of interest in the second resource.

2. The non-transitory computer readable medium of claim 1, wherein:
the first resource is a first software application and the first attribute is a first number of computations required to perform a first function by the first software application; and
the second resource is a second software application and the second attribute is a second number of computations required to perform a second function by the second software application.

3. The non-transitory computer readable medium of claim 1, wherein the first resource is a first virtual machine and the second resource is a second virtual machine.

4. The non-transitory computer readable medium of claim 1, further comprising program code that is executable by the processor for causing the processor to determine the configuration parameter based on the historical data by analyzing the historical data to identify the number of times that the second resource was selected instead of the first resource during a predetermined time interval.

5. The non-transitory computer readable medium of claim 1, further comprising program code that is executable by the processor for causing the processor to determine the configuration parameter by mapping the predetermined probability to the configuration parameter using a lookup table.

6. The non-transitory computer readable medium of claim 1, further comprising program code that is executable by the processor for causing the processor to determine the configuration parameter by:
determining whether an amount of data in the historical data meets or exceeds a predetermined threshold; and
in response to determining that the amount of data is meets or exceeds the predetermined threshold, determining the configuration parameter based on the historical data; and
in response to determining that the amount of data is below the predetermined threshold, determining the configuration parameter based on the predetermined probability.

7. The non-transitory computer readable medium of claim 1, wherein the first amount of interest is dependent on the second amount of interest.

8. The non-transitory computer readable medium of claim 1, further comprising program code that is executable by the processor for causing the processor to use the predetermined model to determine a first gradient associated with the first amount of interest in the first resource and a second gradient associated with the second amount of interest in the second resource.

9. The non-transitory computer readable medium of claim 1, further comprising program code that is executable by the processor for causing the processor to:
receive the first value for the first attribute and the second value for the second attribute as user input; and
transmit the electronic communication as a display transmission configured to cause a display device to output the first amount of interest in the first resource and the second amount of interest in the second resource.

10. A method comprising:
identifying, by a processor, a first resource having a first attribute with a first value;
identifying, by the processor, a second resource that is selectable as an alternative to the first resource and having a second attribute with a second value that is lower than the first value of the first attribute;
determining, by the processor, a configuration parameter based on at least one of (i) historical data that indicates a number of times the second resource was selected instead of the first resource, or (ii) a predetermined probability indicating a rate in which the first resource was used or another rate in which the first resource was not used after being selected, the configuration parameter indicating a likelihood that the second resource will be selected over the first resource;
predicting, by the processor and using a predetermined model, a first amount of interest in the first resource based on the first value, the second value, and the configuration parameter;
predicting, by the processor and using the predetermined model, a second amount of interest for the second resource based on the first value, the second value, the configuration parameter, an elasticity parameter representing how sensitive a base-interest parameter is to a change in another parameter on which the base-interest parameter depends, and a reference value for the first attribute and the second attribute; and
transmitting, by the processor, an electronic communication indicating the predicted first amount of interest in the first resource and the predicted second amount of interest in the second resource.

11. The method of claim 10, wherein:
the first resource is a first software application and the first attribute is a first number of computations required to perform a first function by the first software application; and
the second resource is a second software application and the second attribute is a second number of computations required to perform a second function by the second software application.

12. The method of claim 10, wherein the first resource is a first virtual machine and the second resource is a second virtual machine.

13. The method of claim 10, further comprising determining the configuration parameter based on the historical data by analyzing the historical data to identify the number of times that the second resource was selected instead of the first resource during a predetermined time interval.

14. The method of claim 10, further comprising determining the configuration parameter by mapping the predetermined probability to the configuration parameter using a lookup table.

15. The method of claim 10, further comprising determining the configuration parameter by:
determining whether an amount of data in the historical data meets or exceeds a predetermined threshold; and
in response to determining that the amount of data is meets or exceeds the predetermined threshold, determining the configuration parameter based on the historical data; or
in response to determining that the amount of data is below the predetermined threshold, determining the configuration parameter based on the predetermined probability.

16. The method of claim 10, wherein the first amount of interest is dependent on the second amount of interest.

17. The method of claim 10, further comprising using the predetermined model to determine a first gradient associated with the first amount of interest in the first resource and a second gradient associated with the second amount of interest in the second resource.

18. The method of claim 10, further comprising:
receiving the first value for the first attribute and the second value for the second attribute as user input; and
transmitting the electronic communication as a display transmission configured to cause a display device to output the first amount of interest in the first resource and the second amount of interest in the second resource.

19. A system comprising:
a processing device; and
a memory device in which instructions executable by the processing device are stored for causing the processing device to:
  identify a first resource having a first attribute with a first value;
  identify a second resource that is selectable as an alternative to the first resource and having a second attribute with a second value that is lower than the first value of the first attribute;
  determine a configuration parameter based on at least one of (i) historical data that indicates a number of times the second resource was selected instead of the first resource, or (ii) a predetermined probability indicating a rate in which the first resource was used or another rate in which the first resource was not used after being selected, the configuration parameter indicating a likelihood that the second resource will be selected over the first resource;
  predict, using a predetermined model, a first amount of interest in the first resource based on the first value, the second value, and the configuration parameter;
  predict, using the predetermined model, a second amount of interest for the second resource based on the first value, the second value, the configuration parameter, an elasticity parameter representing how sensitive a base-interest parameter is to a change in another parameter on which the base-interest parameter depends, and a reference value for the first attribute and the second attribute; and
  transmit an electronic communication indicating the predicted first amount of interest in the first resource and the predicted second amount of interest in the second resource.

20. The system of claim 19, wherein:
the first resource is a first software application and the first attribute is a first number of computations required to perform a first function by the first software application; and
the second resource is a second software application and the second attribute is a second number of computations required to perform a second function by the second software application.

21. The system of claim 19, wherein the first resource is a first virtual machine and the second resource is a second virtual machine.

22. The system of claim 19, wherein the memory device further comprises instructions that are executable by the processing device for causing the processing device to determine the configuration parameter based on the historical data by analyzing the historical data to identify the number of times that the second resource was selected instead of the first resource during a predetermined time interval.

23. The system of claim 19, wherein the memory device further comprises instructions that are executable by the processing device for causing the processing device to determine the configuration parameter by mapping the predetermined probability to the configuration parameter using a lookup table.

24. The system of claim 19, wherein the memory device further comprises instructions that are by the processing device for causing the processing device to determine the configuration parameter by:
  determining whether an amount of data in the historical data meets or exceeds a predetermined threshold; and
  in response to determining that the amount of data is meets or exceeds the predetermined threshold, determining the configuration parameter based on the historical data; or
  in response to determining that the amount of data is below the predetermined threshold, determining the configuration parameter based on the predetermined probability.

25. The system of claim 19, wherein the first amount of interest is dependent on the second amount of interest.

26. The system of claim 19, wherein the memory device further comprises instructions that are by the processing device for causing the processing device to use the predetermined model to determine a first gradient associated with the first amount of interest in the first resource and a second gradient associated with the second amount of interest in the second resource.

27. The system of claim 19, wherein the memory device further comprises instructions that are by the processing device for causing the processing device to:
  receive the first value for the first attribute and the second value for the second attribute as user input; and
transmit the electronic communication as a display transmission configured to cause a display device to output the first amount of interest in the first resource and the second amount of interest in the second resource.

* * * * *